(12) United States Patent
Becker

(10) Patent No.: US 10,724,572 B2
(45) Date of Patent: Jul. 28, 2020

(54) ELECTRONICALLY-RELEASABLE SUCTION CUP ASSEMBLY SECURED TO AN APPLIANCE

(71) Applicant: Todd H. Becker, Ridgefield, CT (US)

(72) Inventor: Todd H. Becker, Ridgefield, CT (US)

( * ) Notice: Subject to any disclaimer, the term of this patent is extended or adjusted under 35 U.S.C. 154(b) by 217 days.

(21) Appl. No.: 15/684,075

(22) Filed: Aug. 23, 2017

(65) Prior Publication Data
US 2019/0063488 A1 Feb. 28, 2019

(51) Int. Cl.
*F16B 47/00* (2006.01)
*E05B 73/00* (2006.01)

(52) U.S. Cl.
CPC .............. *F16B 47/00* (2013.01); *E05B 73/00* (2013.01)

(58) Field of Classification Search
CPC combination set(s) only.
See application file for complete search history.

(56) References Cited

U.S. PATENT DOCUMENTS

| | | | |
|---|---|---|---|
| 3,643,992 A | 2/1972 | Jacobucci | |
| 4,121,865 A * | 10/1978 | Littwin, Sr. | B66C 1/0218 294/186 |
| 4,633,585 A | 1/1987 | Whitaker et al. | |
| 4,763,941 A | 8/1988 | Sniderman | |
| 4,960,298 A | 10/1990 | Moroi | |
| 5,190,332 A * | 3/1993 | Nagai | B65G 47/91 271/90 |
| 5,242,565 A * | 9/1993 | Winsel | H01M 6/26 204/265 |
| 5,572,785 A | 11/1996 | Tveit | |
| 5,631,426 A * | 5/1997 | Jao | G01H 1/00 73/587 |
| 6,382,692 B1 | 5/2002 | Schmalz et al. | |
| 6,437,560 B1 * | 8/2002 | Kalb | B25B 11/007 248/363 |
| 6,485,009 B2 | 11/2002 | Kashiwazaki et al. | |
| 6,502,877 B2 * | 1/2003 | Schick | B25J 15/06 294/185 |
| 6,979,032 B2 * | 12/2005 | Damhuis | B25J 15/0052 294/185 |

(Continued)

FOREIGN PATENT DOCUMENTS

| | | |
|---|---|---|
| CA | 2522549 C | 12/2007 |
| EP | 1469131 A1 | 10/2004 |

(Continued)

OTHER PUBLICATIONS

Varta—Gas—Detectors, -Analyzers, Indicators, Hydrogen Sensors—created Aug. 19, 2016 https://products.varta-microbattery.com/applications/mb_data/documents/application_note/Application_Note_Gas_Detection_en.pdf (Year: 2016).*

*Primary Examiner* — Monica E Millner
(74) *Attorney, Agent, or Firm* — Lando & Anastasi, LLP

(57) ABSTRACT

An electronically-releasable suction cup assembly is designed to releasably secure an object to a surface. The suction cup assembly includes a suction cup secured to the object. The suction cup has a cavity and is configured to be releasably secured to the surface. The suction cup assembly further includes a gas generating cell coupled to the suction cup. The gas generating cell is configured to selectively eject fluid into the cavity of the suction cup to release the suction cup from the surface.

14 Claims, 10 Drawing Sheets

(56) References Cited

U.S. PATENT DOCUMENTS

| | | | |
|---|---|---|---|
| 7,086,675 B2* | 8/2006 | Jacobs | B65G 47/90 294/183 |
| 7,309,089 B2* | 12/2007 | Perlman | B25B 11/005 294/189 |
| 7,788,740 B2 | 9/2010 | De Belder et al. | |
| 7,909,374 B2* | 3/2011 | Thallner | H01L 21/6838 294/212 |
| 7,938,466 B2 | 5/2011 | Joguet et al. | |
| 7,963,578 B2* | 6/2011 | Wells | B66C 1/0212 294/2 |
| 7,967,351 B2* | 6/2011 | Wu | B25J 15/0616 294/189 |
| 8,096,537 B2* | 1/2012 | Browne | F16B 47/00 248/205.5 |
| 8,096,598 B2* | 1/2012 | Perlman | B25B 11/007 294/64.2 |
| 9,114,535 B2 | 8/2015 | Wigren | |
| 9,573,280 B2 | 2/2017 | Harter | |
| 9,682,485 B2* | 6/2017 | Moore | B25J 15/0608 |
| 9,728,442 B2* | 8/2017 | Yasuda | H01L 21/6838 |
| 9,908,718 B2* | 3/2018 | Majestic | B28B 13/04 |
| 2003/0014014 A1 | 1/2003 | Nitzan | |
| 2006/0131905 A1* | 6/2006 | Mazzucchelli | B65G 47/91 294/188 |
| 2006/0257701 A1* | 11/2006 | Schumm, Jr. | H01M 2/1229 429/407 |
| 2009/0081501 A1* | 3/2009 | Vu | C01B 3/065 429/436 |
| 2009/0121102 A1* | 5/2009 | Woo | G09F 7/12 248/205.7 |
| 2012/0193500 A1* | 8/2012 | Kniss | B25B 11/007 248/363 |
| 2013/0178752 A1* | 7/2013 | Kodama | A61B 5/0235 600/498 |
| 2016/0136821 A1* | 5/2016 | Vaughn | B25J 15/0625 294/183 |
| 2017/0020192 A1 | 1/2017 | Fregonese et al. | |
| 2017/0043065 A1* | 2/2017 | Takeuchi | A61M 1/0003 |

FOREIGN PATENT DOCUMENTS

| | | |
|---|---|---|
| EP | 1469132 A2 | 10/2004 |
| EP | 1840280 A2 | 10/2007 |
| EP | 2463065 A1 | 6/2012 |
| WO | 2004092492 A1 | 10/2004 |
| WO | 2010088925 A1 | 8/2010 |

* cited by examiner

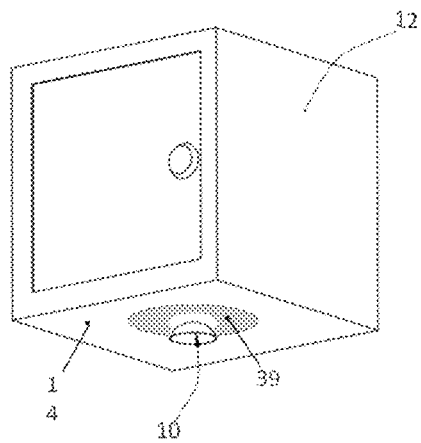

*FIG. 8A*

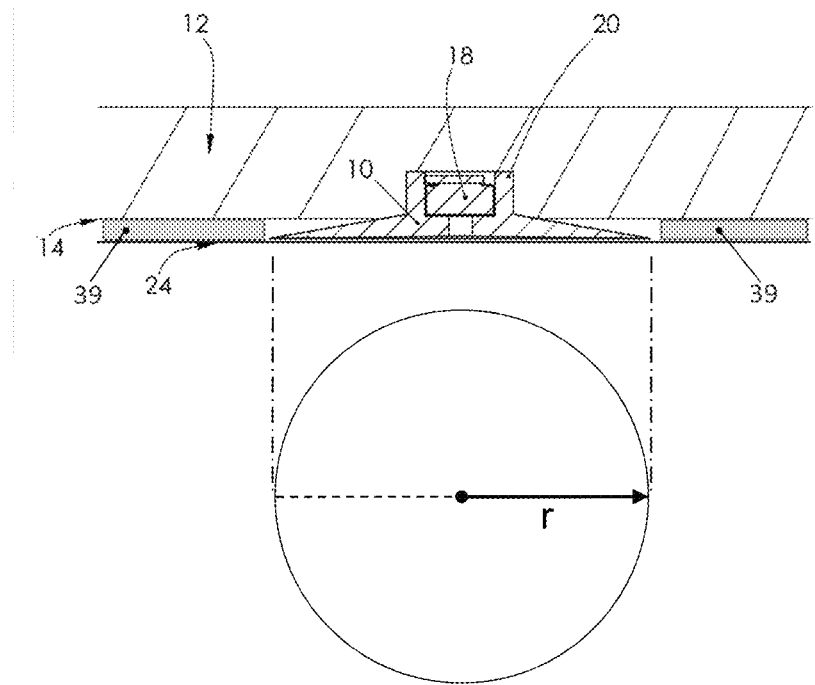

*FIG. 8B*

M = mass of object 12
P = atmospheric pressure
G = gravity = 9.8 meters / sec$^2$
μ = coefficient of friction between surface 24 and material 39
A = area covered by the suction cup assembly 10 when attached to surface 24
r = radius of the suction cup assembly 10 when attached to surface 24
$F_v$ = force of suction from the evacuated cavity
$F_n$ = Newtonian force of of gravity for the object 12
$F_f$ = force of friction between surface 24 and material 39

Where
$F_f = \mu (F_n + F_v)$
$F_n = M G$
$F_v = A P$
$A = \pi r^2$
Then
$F_f = \mu (MG + \pi r^2 P)$

*FIG. 8C*

ELECTRONICALLY-RELEASABLE SUCTION CUP ASSEMBLY SECURED TO AN APPLIANCE

BACKGROUND OF DISCLOSURE

1. Field of Disclosure

The present disclosure generally relates to systems and methods used to secure products on a surface, and more specifically to an electronically-releasable suction cup assembly designed to releasably secure an appliance to a surface.

2. Discussion of Related Art

In today's electronic age, people often carry on their person many small objects and devices of substantial value, including money, wallets, identification documents, jewelry, and portable electronic devices. In considering the development of a portable safe for securing such valuables in college dormitories or other temporary living spaces, one is faced with several challenges related to the safe. One challenge is that valuables must be secured so that access is limited to the owner of the safe and valuables. Another challenge is that the safe must be portable so that it can be easily moved from one's permanent home to one's temporary living accommodation (e.g., home to college, and back again). Yet another challenge is that the safe must be physically secured so that a person of bad intent cannot easily take the safe and its contents. One more challenge is that the safe must be physically secured in such a manner that it will not mar, damage or alter the physical premise of the temporary living space. Another challenge is that the safe should be secured to a flat surface, such as a hardwood floor, shelf, or surface of furniture, since such surfaces are readily available in most temporary living spaces.

Similarly, individuals often need to temporarily secure valuable items while traveling, working or going out socially. As one example, expensive tools and toolboxes are often stolen from construction sites. As another example, individuals often need to secure purses, brief cases, satchels or other cases containing valuable items while traveling or dining out. In such use cases, the objects can be directly secured to a flat surface, or can be secured with a chain or cable whose two ends can be secured to that flat surface.

SUMMARY OF DISCLOSURE

One aspect of the present disclosure is directed to an electronically-releasable suction cup assembly to releasably secure an object to a surface. In one embodiment, the suction cup assembly includes a suction cup secured to the object. The suction cup has a cavity and is configured to be releasably secured to the surface. The suction cup assembly further includes a gas generating cell coupled to the suction cup. The gas generating cell is configured to selectively eject fluid into the cavity of the suction cup to release the suction cup from the surface.

Embodiments of the suction cup assembly further may include configuring the suction cup with a center head that is secured to the object and a base that defines the cavity. The base may be configured to be releasably secured to the surface by forming a vacuum with the surface. The base of the suction cup may be fabricated from elastic, flexible material, and includes a flat or curved surface. The gas generating cell may be inserted into an opening defined by the center head of the suction cup. The gas generating cell may include at least one ejection port that is in fluid communication with the cavity of the base of the suction cup. The gas generating cell may be connected to an electronic circuit to control the ejection of fluid from at least one ejection port of the gas generating cell. The electronic circuit may include a resistor and a switch, the switch being configured to take the resistor in and out of contact with positive and negative ends of the gas generating cell. The gas generating cell may be inserted into the opening of the center head of the suction cup to enable electrical contact on both sides of the gas generating cell to the resistor placed in parallel to the gas generating cell. The resistor may be configured with a resistance value to cause the gas generating cell to eject sufficient hydrogen from the at least one ejection port to alleviate or otherwise relieve a vacuum in the cavity of the suction cup to release the base of the suction cup from the surface. The switch may control when the circuit is closed and the gas generating cell is on to eject fluid from the at least one ejection port.

Another aspect of the disclosure is directed to a method of releasably securing an object to a surface. In one embodiment, the method includes: securing a suction cup of an electronically-releasable suction cup assembly to the object, the suction cup having a cavity and being configured to be releasably secured to the surface; and selectively ejecting gas from a gas generating cell coupled to the suction cup, the gas generating cell being configured to selectively eject fluid into the cavity of the suction cup to release the suction cup from the surface.

Embodiments of the method further may include configuring the suction cup with a center head that is secured to the object and a base that defines the cavity. The base may be configured to be releasably secured to the surface by forming a vacuum with the surface. The base of the suction cup may be fabricated from elastic, flexible material, and includes a flat or curved surface. The method further may include inserting the gas generating cell into an opening defined by the center head of the suction cup. The gas generating cell may include at least one ejection port that is in fluid communication with the cavity of the base of the suction cup. The method further may include connecting the gas generating cell to an electronic circuit to control the ejection of fluid from the at least one ejection port. The electronic circuit may include a resistor and a switch, the switch being configured to take the resistor in and out of contact with positive and negative ends of the gas generating cell. The gas generating cell may be inserted into the opening of the center head of the suction cup to enable electrical contact on both sides of the gas generating cell to the resistor placed in parallel to the gas generating cell. The resistor may be configured with a resistance value to cause the gas generating cell to eject sufficient hydrogen from the at least one ejection port to alleviate or otherwise relieve a vacuum in the cavity of the suction cup to release the base of the suction cup from the surface. The switch may control when the circuit is closed and the gas generating cell is on to eject fluid from the at least one ejection port.

BRIEF DESCRIPTION OF DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of embodiments of the disclosure. In the figures:

FIG. 8A is a perspective view of an appliance having a non-skid material with a high coefficient of friction to a surface added with a suction cup assembly to a bottom of the appliance to resist sliding as well as lifting;

FIG. 8B is a cross-sectional view of the appliance having the non-skid material shown in FIG. 8A;

FIG. 8C is an equation showing the force of friction between a surface and the non-skid material;

DETAILED DESCRIPTION

Figure 1A:
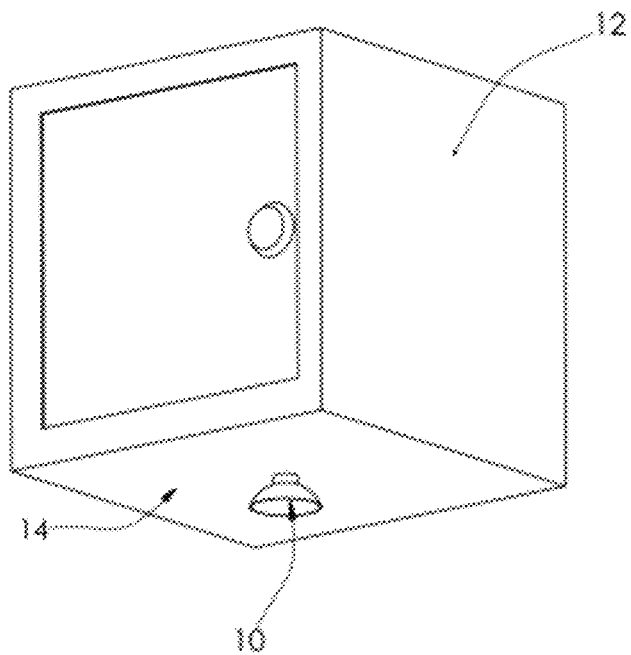
FIGS. 1A and 1B are perspective views of an electronically-releasable suction cup assembly of an embodiment of the present disclosure that is secured to an appliance, such as a portable safe (FIG. 1A) or portable laptop computer (FIG. 1B)

It is to be appreciated that embodiments of the systems and methods discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

One embodiment of the present disclosure is directed to an electronically-releasable suction cup assembly, which can be used to secure a variety of objects to flat surfaces, among other uses. The suction cup assembly includes a suction cup and a gas generating cell that is secured to the suction cup. With the base of the suction cup adhered to a flat surface and forming a vacuum, the button-sized gas generating cell is inserted into a center head of the suction cup, such that an ejection port of the gas generating cell is in fluid (gas or liquid) communication with the evacuated "headspace" of the suction cup. The gas generating cell is connected to an electronic circuit comprised of a resistor and a switch, such that the switch is able to take the resistor in and out of contact with the positive and negative ends of the gas generating cell. Furthermore, the resistor is selected with a resistance value to cause the gas generating cell to eject sufficient gas, such as hydrogen, to alleviate the vacuum in the headspace of the suction cup, thereby releasing the suction cup from the surface, along with any other items that are permanently affixed to or by the suction cup.

Figure 1B:
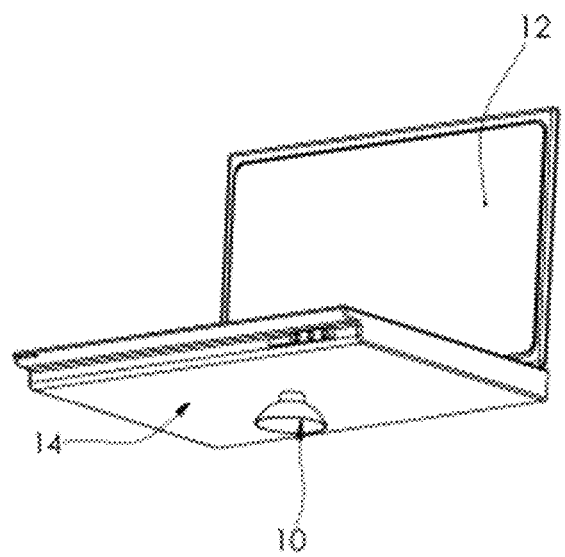

Referring to the drawings, and more particularly to FIGS. 1A and 1B, an electronically-releasable suction cup assembly is generally indicated at 10. As shown, the suction cup assembly is secured to an appliance, generally indicated at 12, such as a portable safe shown in FIG. 1A. Specifically, the appliance 12 includes a bottom wall 14 on which the suction cup assembly 10 is secured. The arrangement is such that the suction cup assembly 10 is configured to releasably secure the appliance 12 to a flat surface, such as a table or flooring surface. When desired, the suction cup assembly 10 is configured to release the appliance 12 from the flat surface, thereby enabling the removal of the appliance from the flat surface. Although one suction cup assembly 10 is shown in FIGS. 1A and 1B, it should be understood that two or more suction cup assemblies can be provided for larger appliances requiring additional securing force. As shown in FIG. 1B, the suction cup assembly 10 can be provided on other types of appliances 12, such as a laptop computer.

Figure 2A:
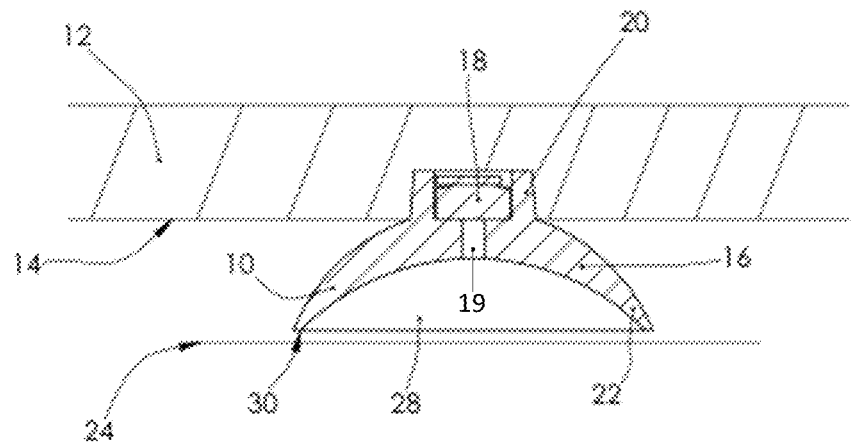
FIGS. 2A and 2B are cross-sectional views of the electronically-releasable suction cup assembly attached to the base of the appliance shown in FIG. 1A, with the appliance shown in FIG. 2A in a unsecured state and the appliance shown in FIG. 2B in a secured state.
Figure 2B:
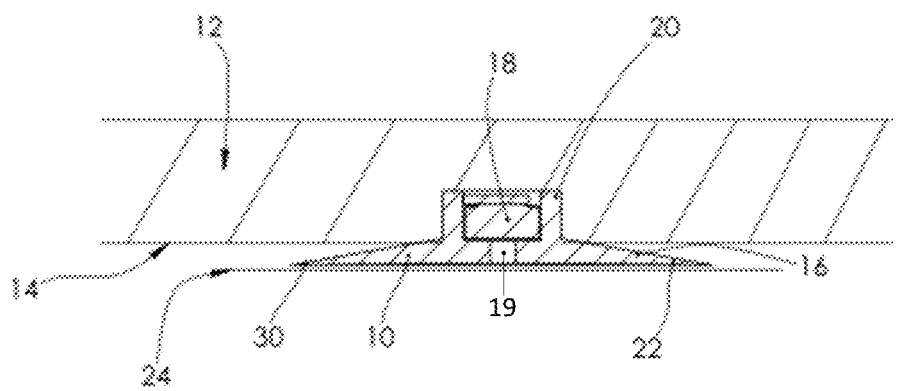

Referring to FIGS. 2A and 2B, the suction cup assembly 10 includes a suction cup 16 and a gas generating cell 18 disposed within the suction cup 16. Specifically, the suction cup 16 includes a center head 20 that is secured to the bottom wall 14 of the appliance 12 and a base 22 that is configured to be adhered to a flat surface 24 by forming a vacuum with the flat surface 24. The button-sized gas generating cell 18 is inserted into an opening 25 (FIG. 3B) of the center head 20 of the suction cup 16, such that the gas generating cell 18 is in fluid communication with the vacuum cavity 28 via a channel 19 as shown in FIG. 4A. In another configuration shown in FIG. 4B, the gas generating cell 18 is inserted into a similar opening in the top of the vacuum cavity 28. In all configurations, the ejection ports, indicated at 26 in FIG. 5, are in fluid (gas or liquid) communication with the evacuated cavity 28 of the base 22 of the suction cup 16.

In one embodiment, the working base 22 of the suction cup 16 is made of elastic, flexible material, and can include a flat or curved rim 30 that matches the flat or curved surface 24 to which it attaches. The suction cup material can also be made of multiple materials, such as a composite designed for desirable features, such as gas permeability for low air leakage, high tensile strength for tamper or cut resistance, and high melt temperature for heat resistance, to name a few. The base 22 of the suction cup 16 illustrated in FIGS. 2A and 2B is shown to be flat, but a curved wall can be provided as well. When the center head 20 of the suction cup 16 is pressed against a flat, non-porous surface 24, a volume of a cavity or space 28 ("headspace") between the base 22 of the suction cup 16 and the flat surface 24 is reduced, which causes fluid (e.g., air) between the base 22 of the suction cup and the flat surface 24 to be expelled past the rim 30 of the base of the circular suction cup 16. The cavity 28, which develops between the suction cup 16 and the flat surface 24, has little to no air or water in it because most of the fluid has already been forced out of the inside of the base 22 of the suction cup 16 by, for example, an individual's physically applied force or the weight of the appliance 12, which reduces the pressure within the base of the suction cup 16.

A pressure difference between the atmosphere on the outside of the suction cup 16 and the low-pressure cavity 28 on the inside of the base 22 of the suction cup 16 maintains the base 22 of the suction cup 16 adhered to the flat surface 24. The force exerted by this vacuum is conventionally calculated as $F_v = AP$ where $F_v$ is the vacuum force, A is the area of the surface covered by the cup (Pi times radius squared or $A = \pi r^2$, for a circular suction cup 16), and P is the pressure outside the cup (for example, atmospheric pressure for an air suction cup 16 at sea level). The electronically releasable suction cup assembly 10 can be designed for different use cases by adjusting the various design parameters herein described, such as the radius of suction cup 16, the materials comprising suction cup 16 or its component parts like the center head 20, base 22 or rim 30, to name a few. Also, one or more electronically releasable suction cup assemblies 10 can be integrated into customized fastening systems for different use cases.

In one embodiment shown in FIGS. 8A and 8B, the suction cup assembly 10 and a non-skid material 39 are attached to the bottom 14 of an appliance 12. The non-skid material and surface 24 have a high coefficient of friction that resists lateral sliding of an appliance 12 along a surface 24. While the suction cup assembly 10 with an evacuated vacuum chamber 28 provides a resistive force to lifting the appliance 12 from the surface 24, the non-skid material provides a resistive force of friction between the bottom 14 of an appliance 12 and the surface 24 upon which the appliance 12 is placed. The force of friction $F_f$ is governed by the model $F_f = \mu p$, $F_n$ where μ is the coefficient of friction, an empirical property of the contacting materials comprising the non-skid material 39 and the surface 24, and $F_n$ is the normal force exerted by the exterior bottom wall 14 of the appliance 12, directed perpendicular to the surface 14. For a flat, non-sloped surface 24, the normal force is conventionally expressed as $F_n = MG$ where M is the mass of the appliance 12 and G is gravitational acceleration which on Earth is 9.8 meters per second-squared. This force $F_n$ is applied as a vector that is perpendicular to the surface 14. In embodiments of the present disclosure, the normal force $F_n$ is augmented by an additive force also applied to the surface 14 as a perpendicular vector, the vacuum force $F_v$. Thus, the force of friction becomes a function of both the force of gravity plus the force of the vacuum applied by the suction cup assembly 10. Accordingly, the forces applied by the new system can be described as the force of friction $F_f = \mu(F_n + F_v) = \mu(MG + AP) = \mu(MG + \pi r^2 P)$. Thus, the force of friction is a design parameter as a function of the coefficient of friction between the non-skid material 39 and the surface 24, the mass of the appliance 12, and the radius of the suction cup assembly 10. By selecting appropriate suction cup assemblies 10 and non-skid materials for a particular appliance 12, the appliance 12 can be secured to a surface 24 in such a way so as to resist lifting and sliding of the appliance 12 from its original position on surface 24.

When physical pressure caused by the weight of the appliance 12 ceases to apply, the elastic substance of the base 22 of the suction cup 16 tends to resume its original shape. In most instances, a length of time for which the suction effect can be maintained depends mainly on how long it takes for air or water to leak back into the cavity 28 between the base 22 of the suction cup 16 and the flat surface 24, equalizing the pressure with the surrounding atmosphere. However, the weight of the appliance 12, e.g., the portable safe, maintains the pressure on the base 22 of the suction cup 16 thereby ensuring that the suction force is maintained.

Figure 3A:
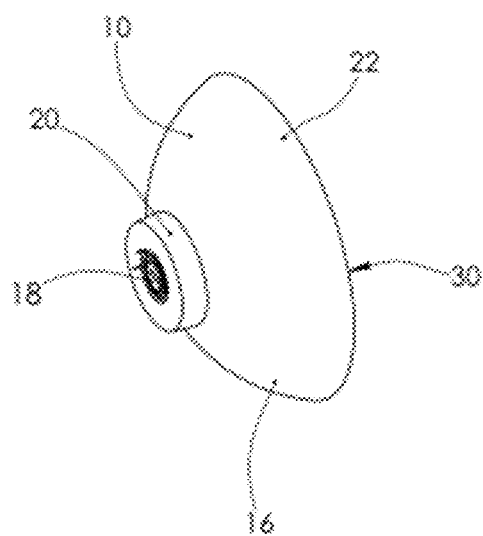
FIG. 3A is a perspective view of the electronically-releasable suction cup assembly removed from the appliance.
Figure 3B:
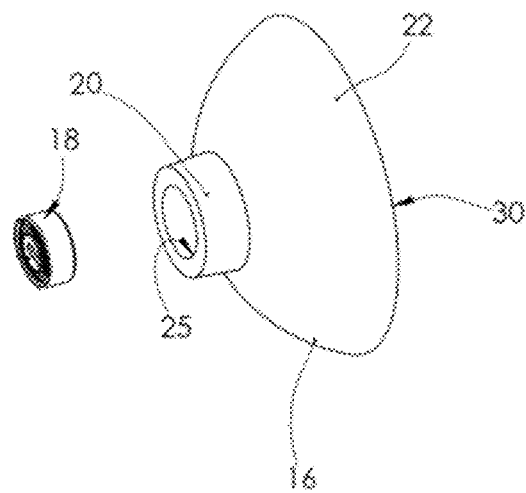
FIG. 3B is a perspective view of the electronically-releasable suction cup assembly with a gas generating cell removed from a suction cup.
Figure 4A:
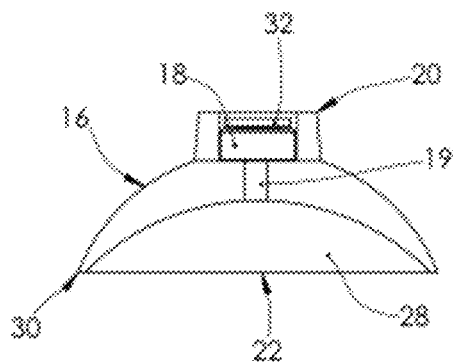
FIG. 4A is a cross-sectional view of the gas generating cell inserted into a cavity in a center head of the suction cup.

Referring to FIGS. 3A and 3B, one manner in which the gas generating cell 18 is secured to the center head 20 of the suction cup 16 is shown. The center head 20 of the suction cup 16 is cylindrical in shape, and includes the opening 25 that is sized to receive the cylindrical, button-sized gas generating cell 18. The ejection port(s) 26 of the gas generating cell 18 is positioned so as to provide fluid communication into the vacuum cavity 28 of the suction cup 16. As shown in FIG. 4A, a gas generating cell 18 inserted into the open space of the center head 20 may also include the channel 19 beneath the ejection ports 26 providing a conduit to carry the ejected fluid into the cavity 28 of the base 22 of the suction cup 16.

Figure 4B:
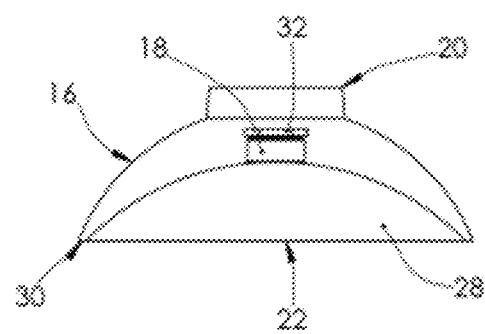
FIG. 4B is a cross-sectional view of the gas generating cell inserted into the cavity in an interior center top of the vacuum cavity of the suction cup.
Figure 5:
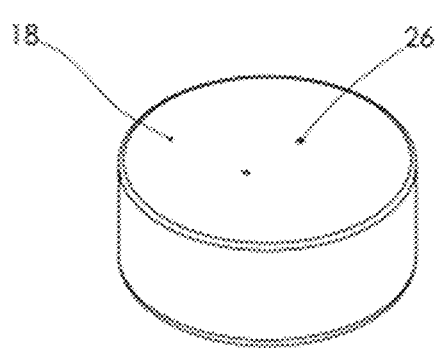
FIG. 5 is a perspective view of the gas generating cell.

FIG. 4B shows another variation, in which the gas generating cell 18 is not inserted from the top of the center head 20, but rather is inserted from the vacuum cavity 28 side of suction cup 16. In this configuration, the opening 25 on the inside of the vacuum cavity 28 contains the gas generating cell 18, with direct fluid communication between its ejection ports 26 and the vacuum cavity 28. In this configuration, the gas generating cell 18 is contained entirely within the suction cup assembly 10. With the gas generating cell 18 open to the vacuum chamber 28, users may find it easier to service and replace the gas generating cell 18 when it becomes discharged, especially when the center head 20 of the suction cup 16 is permanently mounted on an appliance 12.

Figure 7A:
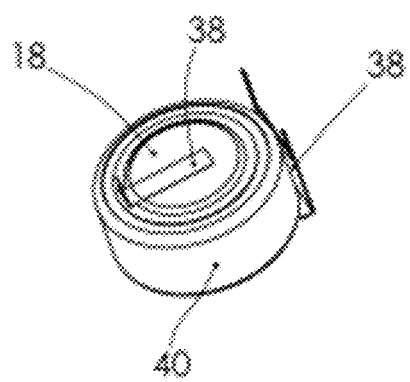
FIGS. 7A and 7B are perspective views of the top and bottom of the gas generating cell with electrical contact tabs and insulation around the gas generating cell.
Figure 7B:
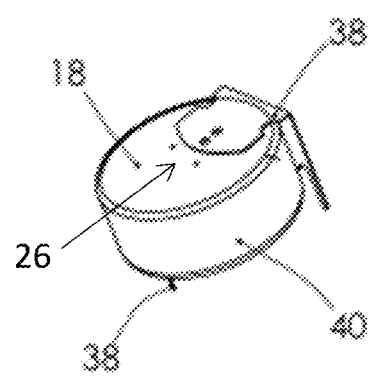
Figure 7C:
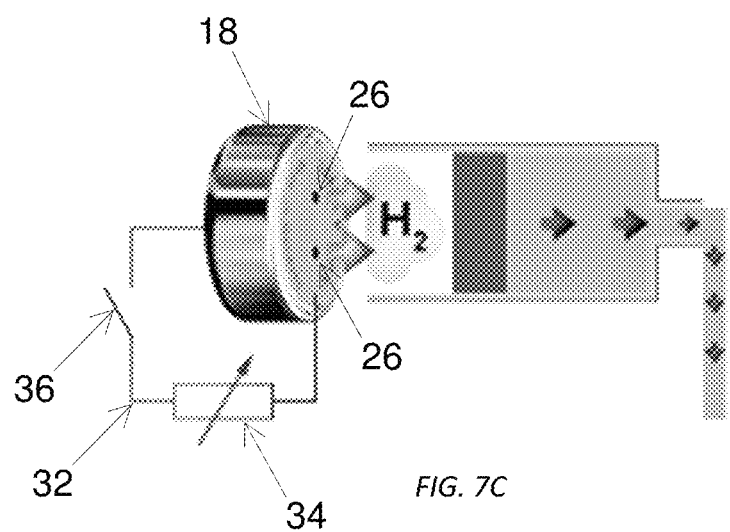
FIG. 7C is a schematic view of the operative components of the gas generating cell.

Referring to FIG. 7C, the gas generating cell 18 is connected to an electronic circuit 32 comprised of a resistor 34 and a switch 36, such that the switch is able to take the resistor in and out of contact with positive and negative ends of the gas generating cell 18. The gas generating cell 18 is inserted into the opening 25 of the center head 20 to enable electrical contact on both sides of the gas generating cell 18 to the resistor 34 placed in parallel to the gas generating cell 18.

Furthermore, the resistor 34 is selected with a resistance value to cause the gas generating cell 18 to eject sufficient gas from the ejection ports 26 to alleviate or otherwise relieve the vacuum in the vacuum cavity 28 of the suction cup 16, thereby releasing the base 22 of the suction cup from the flat surface 24, along with any other items that are permanently affixed to the top of the suction cup 16. The resistance value of the resistor 34 is negatively correlated to the air volume the uncompressed vacuum cavity 28 in the base 22 of the suction cup 16, as, for example, an inverse function.

The switch 36 controls when the circuit is closed and the gas generating cell 18 is "on" and generating gas. The amount of time during which the switch 36 is closed is positively correlated to the air volume of the uncompressed vacuum cavity 28 in the base 22 of the suction cup 16, as, for example, a positive function. In one embodiment, the switch 36 can be accessed within an interior of the appliance 12. In another embodiment, the switch 36 can be triggered on an exterior surface of the appliance 12 through the operation of a security mechanism such as for example a keypad or biometric device. In yet another embodiment (see FIG. 11), the switch 36 can be triggered by a remote control 42, cell phone, or some other similar device, that is conductively, electronically, or wirelessly connected to the switch 36 while separate from the appliance 12.

In another embodiment, the entire assembly of the gas generating cell 18 and the electronic circuit 32 can be enclosed within material forming the suction cup 16, along with other components of the suction cup assembly 10, such as a blue tooth circuit on the electronic circuit to facilitate wireless communication.

Figure 6:
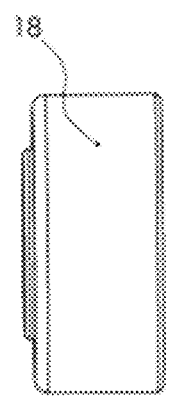
FIG. 6 is a side view of the gas generating cell.

Referring to FIGS. 5 and 6, in one embodiment, the gas generating cell 18 is relatively small in size. For example, the gas generating cell 18 has a diameter of approximate 11.45 to 11.60 millimeters (mm) and a thickness or height of 5.15 to 5.50 mm. It should be understood that a diameter and a height of the center head 20 of the suction cup 16 and a diameter and a height of the gas generating cell 18 that is inserted into the center head can be varied based on the intended use of the suction cup assembly 10.

Referring to FIGS. 7A and 7B, the gas generating cell 18 may include one or two electrical contact tabs 38 that allow for an electrical connection to an electronic circuit 32 including the resistor 34 and switch 36, such that the electronic circuit 32 is external to or physically separate from the suction cup assembly 10 comprising the suction cup 16 and gas generating cell 18. In one embodiment, an electrical contact tab 38 provides for an insulated connection to the positive and negative polar sides of the gas generating cell 18, through the inclusion of insulation 40 around an edge of the gas generating cell 18 whose purpose is to avoid a short circuit of the positive and negative polar sides of the gas generating cell, equivalent to a closed switch 36 with zero resistance.

Figure 9:
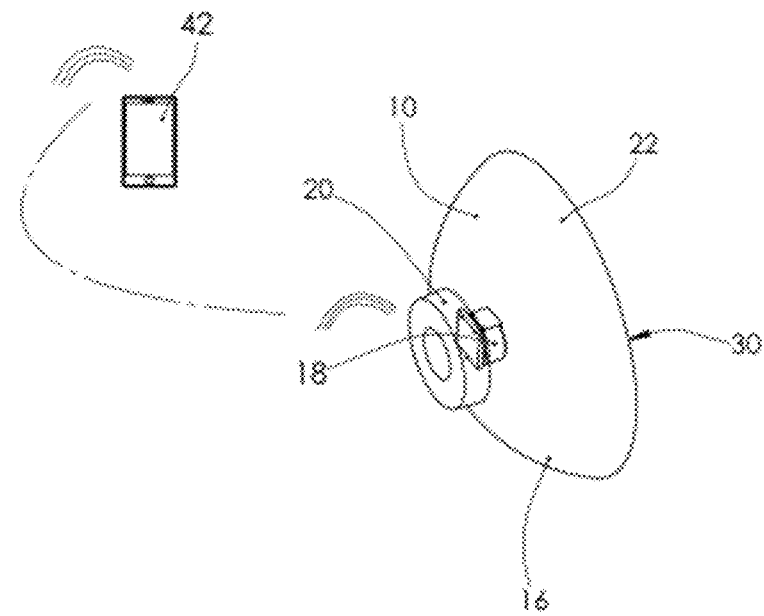
FIG. 9 is a perspective view of the gas generating cell coupled with an electronic circuit that contains a wireless communication module, inserted into the suction cup assembly to control the operation of the suction cup assembly.
Figure 10:
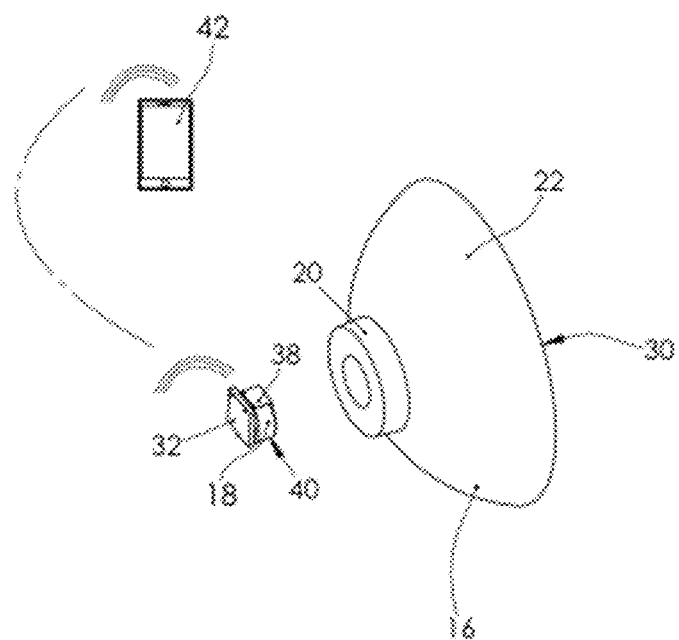
FIG. 10 is a perspective view of the gas generating cell and electronic circuit removed from the suction cup in FIG. 9.
Figure 11:
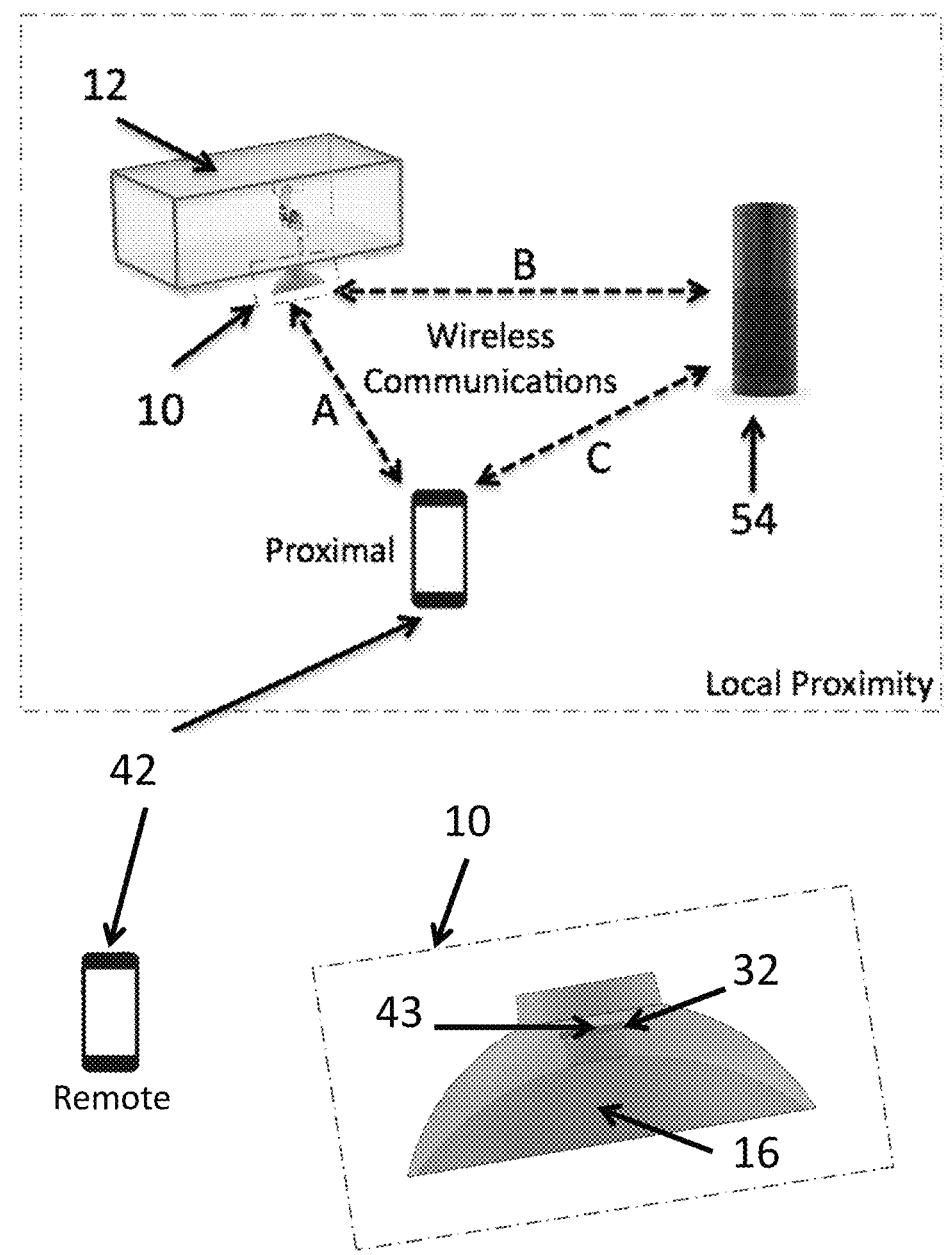
FIG. 11 shows a methodology for communications among the suction cup assembly, a room monitoring appliance and an authorized user's mobile device.

Referring to FIGS. 9-11, the gas generating cell 18 is integrated within the suction cup assembly 10 along with an electronic circuit 32 that includes a wireless communication module 43 (FIG. 11), such as for example a blue tooth or other electromagnetic communication circuit. In one embodiment, the suction cup assembly 10 includes an electronic circuit 32 that is in wireless communication with a remote control device 42, such that an individual can release the vacuum within the vacuum cavity 28 of the suction cup assembly 10 by activating the switch 36 on the electronic circuit 32 through a security authentication mechanism in the remote control device 42. In another such embodiment, an individual can simultaneously release the vacuums within more than one suction cup assemblies 10 using the security authentication enabled by a single remote control 42.

In yet another embodiment, the state of the suction cup assembly 10 or of its component parts is communicated to the remote control 42. For example, the electronic circuit 32 can be programmed to track the number of activations of the gas generating cell 18. By combining this information with the manufacturer's published specifications regarding the capacity of the gas generating cell 18, the electronic circuit 32 can calculate the predicted life of the gas generating cell 18 within a suction cup assembly 10, and communicate that information to a user's mobile device 42 so that the user knows when to replace or recharge the suction cup assembly 10 or its component parts. This information may be communicated to a user's mobile phone using an application or "app" that graphically indicates a meter from 100% full to 0% empty representing the current capacity of the gas generating cell 18. With this information, the app may be programmed to notify the user by way of electronic alerts, such as text messages or alarms, when suction cup assemblies 10 monitored by the app, or their component parts, require service or maintenance.

In another embodiment, the electronic circuit 32 within the suction cup assembly 10 has coupled to it one or more sensors which measure certain information related to the operational state of the suction cup assembly 10 or the performance of its security. For example, a pressure sensor or pressure switch electronically coupled to the electronic circuit 32, can be used to detect the presence or absence of a vacuum in the suction cup's headspace 28. The status of this sensor can then be communicated to the user as previously discussed, so that the user can confirm the proper function of the device. Similarly, the electronic circuit 32 with the suction cup assembly 10 integrated with sensors and wireless communications could be programmed to present the user with an alert, if and when the suction cup 16 was deactivated, suggesting a possible compromise of its main security function.

In certain embodiments, the suction cup assembly 10 is programmed to recognize its authorized users when they are in local proximity to the suction cup assembly 10. As part of a set-up procedure shown in FIG. 11, the authorized user physically activates a feature in the suction cup assembly 10, which causes the suction cup assembly to enter a mode which allows the radio frequency module 43 in the electronic circuit 32 to be paired with the authorized user's remote control 42 (for example, an app-based device like a mobile phone, pad device, similar app-based device). Once the suction cup assembly 10 and remote control 42 are communicatively coupled via wireless communications A, the authorized user operates the remote control 42 to instruct the electronic circuit 32 to store the unique radio frequency identifier (RFID) of the authorized user's remote control in its non-volatile memory.

The electronic suction cup assembly 10 is programmed to periodically broadcast its unique radio frequency identifier and to scan for other radio frequency signals. The remote control 42 also periodically broadcasts its unique radio frequency identifier and scans for other radio frequency signals. When the authorized user carries the remote control 42 in local proximity to the suction cup assembly 10, the electronic suction cup assembly 10 recognizes the unique RF identifier of the remote control 42 as one it has stored and authorized, and thereby recognizes the close proximity of the user. Similarly, when the authorized user carries the remote control 42 out of local proximity to the electronic suction cup assembly 10, the electronic circuit 32 acknowledges the absence of the RF identifier of the remote control 42, recognizing the absence of remote control 42 and its authorized user. In this manner, the electronic suction cup assembly 10 is able to detect the absence or presence of the user's remote control 42, and by proxy, the user.

This same set-up and operation procedure can work in reverse, with the authorized user's remote control 42 remembering the RF identifier of the suction cup assembly 10. This procedure also works for multiple suction cup assemblies 10 and multiple remote controls 42, with each device (10 or 42) storing the unique RF identifier of those with which it has been paired.

The electronic suction cup assembly 10 can execute different software programs or defined protocols using this proximity-based information. For example as shown in FIG. 11, the suction cup assembly 10 can also be paired via wireless communications B with wireless room monitoring devices 54 that are always present in the local proximity, such as an Amazon Echo or similar device. The room monitoring device 54 can be programmed to regularly monitor for the radio frequency identifier of a suction cup assembly 10 in its local proximity. If the suction cup assembly 10 is removed from the local proximity of the room monitoring device 54, the room monitoring device 54 can run software that recognizes the absence of a unique RF identifier of the suction cup assembly 10, and then reports its absence to the authorized user's mobile phone 42 as illustrated as wireless communications C.

The suction cup assembly 10 can also be paired with that authorized user's mobile phone 42, such that the suction cup assembly 10 recognizes when the authorized user is present in the local proximity or absent and remote as illustrated by wireless communications A. Based on that information, the suction cup assembly 10 can be programmed to allow or deny attempts to activate the gas generating cell 18 by an unauthorized user who doesn't have the properly recognized unique RF identifier of the authorized user's mobile phone 42. In this case, the authorized RF identification pairing can act as a proximity-based electronic key in a single factor authentication protocol, or can act as an additional proximity-based factor within a multi-factor authorization or identity authentication security protocol.

In another embodiment, the electronic circuit 32 of the suction cup assembly 10 also includes a vibration sensor or a motion sensor, such as an accelerometer. If the suction cup assembly 10 while attached to an appliance 12 determines from these sensors that the appliance 12 is being moved, lifted or otherwise tampered with, it can be programmed to take one or more predefined actions triggered by the sensed event. For example, if the suction cup assembly 10 is currently paired to a room monitoring device 54, it can inform the room monitoring device 54 of the unauthorized tampering. The room monitoring device 54 can then alert the authorized user about the tampering via the internet, by sending a message to the user's mobile device 42 which is not in local proximity. The suction cup assembly 10 can also take other actions, including for example triggering an audible alert or visible lights that draw attention to the tampering attempt within the local proximity. By combining the previously disclosed proximity detection feature with the motion detection feature, the suction cup assembly 10 can operate software that monitors for tampering and takes appropriate action only when the authorized owner is not present, eliminating false tampering alerts or actions when the authorized user is present.

In one embodiment, the gas generating cell 18 of the electronically-releasable suction cup assembly 10 includes a hydrogen gas generating cell ("HGGC") which acts as an electrochemical micro-pump. An HGGC 18, similar in size and construction to a small watch-size battery, is configured to store power chemically within a small metallic case, with positive and negative polar sides. As shown in FIG. 7C, when the HGGC 18 is activated by applying the resistor 34 across its positive and negative poles, the HGGC ejects a finely metered amount of hydrogen gas from one or two small pin holes, e.g., ejection ports 26, in the center face of the battery. By altering the size of the resistor 34, one can achieve a precise, predictable and consistent volume of gas whenever the gas generating cell 18 is activated by the switch 36 of the electronic circuit 32 in series with the resistor 34, and in parallel to two poles of the HGGC 18. In a particular embodiment, the HGGC 18 is a 1/V 150 H2 MF cell manufactured by Varta Microbattery GmbH of Ellwangen, Germany.

As an example, one can permanently affix one or more suction cup assemblies 10 to the base or bottom wall 14 of the appliance 12. An individual secures the appliance 12 to a flat surface 24 by applying pressure to the top of the appliance, thereby causing the suction cup 16 of each suction cup assembly 10 to evacuate and form individual vacuums between each suction cup 16 and the flat surface 24 beneath. The weight of the appliance 12 also can cause the suction cup 16 of each suction cup assembly 10 to form a vacuum with the flat surface 24. Each suction cup assembly 10 has an HGGC 18 embedded in the center head 20 of the suction cup 16 such that the ejection ports 26 of the HGGC is open to the suction cup vacuum. When the manual or electronic switch 36 is activated, each of the hydrogen cells is simultaneously activated, thereby ejecting the prescribed amount of hydrogen into the evacuated vacuum cavity 28 of each suction cup 16. The appliance 12 can then be picked up and moved.

In another example, where the appliance 12 is relatively heavy so that its own weight would cause the suction cups 16 of the suction cup assemblies 10 to secure against the flat surface 24, then the activating switch 36 of the electronic circuit 32 can be activated by a remote control device 42 that is integrated into a graspable feature of the appliance 12, such that the user can simultaneously release the suction cup vacuum pressure and lift the appliance with a single action. In this example, the user can simultaneously activate each HGGC 18, thereby releasing each vacuum, while simultaneously lifting the appliance 12 free of the flat surface. The handheld device 42 can also provide secure authentication of the authorized user and communicate that authorization to one or more suction cup assemblies 10, thereby releasing the appliance 12 from the surface 24.

In another embodiment, the gas generating cell 18 of the electronically-releasable suction cup assembly 10 may be replaced with another type of non-mechanical micro-pump whose actuation mechanism functions with electro-chemical, electro-hydrodynamic, electro-osmotic, or ultrasonic flow generation. In yet another embodiment, the gas generating cell 18 of the electronically-releasable suction cup assembly 10 may be replaced with an electro-mechanical device such as an actuator, pump or valve which releases fluid into the evacuated vacuum cavity 28 of each suction cup 16, or a micro-electro-mechanical system or MEMS operating as a micro-pump, whose actuation mechanism utilizes piezoelectric, electrostatic, thermo-pneumatic, pneumatic or magnetic effects.

In another embodiment, an electronic authentication mechanism, such as one or more fingerprint scanners, is integrated into one or more handles on the appliance 12, thereby enabling the release of all suction cup assemblies 10 attached to appliance 12 in coordination with a simultaneous physical lifting motion. Similarly, a mechanical switch 36 or other physical trigger can be integrated into the appliance 12, enabling activation of the gas generating cell 18 and release of the suction cup assemblies 10. This physical trigger can also be automatically enabled or disabled based on one or more other security authentication methods, such as the proximity detection feature previously described. In this case, for example, the suction cup assembly 10 can be programmed so that the gas generating cells 18 would not activate based on operation of the physical trigger alone, but only if the proximity detection feature confirms the presence of an authorized individual as confirmed by recognizing the unique radio frequency identifier of a previously paired and authorized mobile phone 42.

Figure 12A:
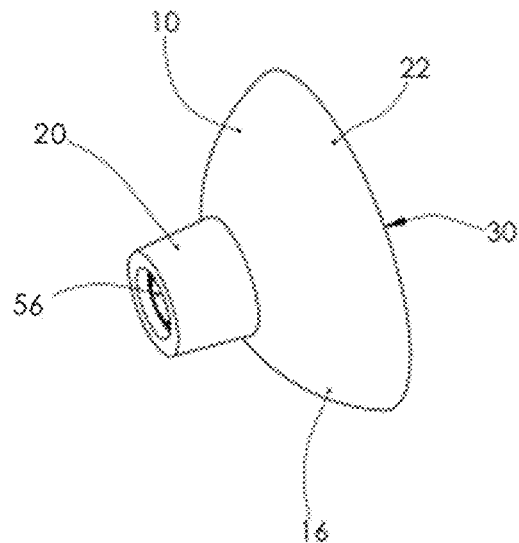
FIG. 12A is a perspective view of an assembled suction cup assembly having a battery cell added as a power source for the electronic circuit and wireless communications module.
Figure 12B:
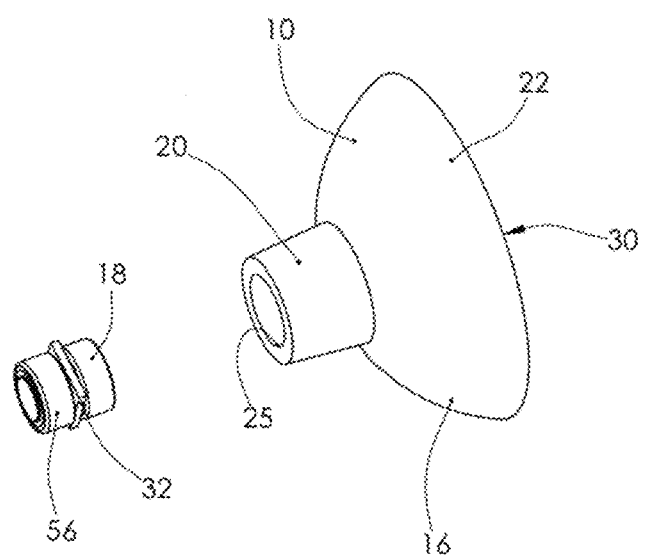
FIG. 12B is an exploded perspective view of the suction cup assembly shown in FIG. 12A.

In another embodiment shown in FIGS. 12A and 12B, a chemical battery cell 56 is integrated into the suction cup assembly 10 along with the gas generating cell 18. The purpose of the chemical battery cell 56 is to provide power to the electronic circuit 32. This configuration can also include more than one chemical battery cell 56 or a power source other than a chemical battery cell, depending on the power requirements of the suction cup assembly 10 and its electronic circuit 32.

Figure 13A:
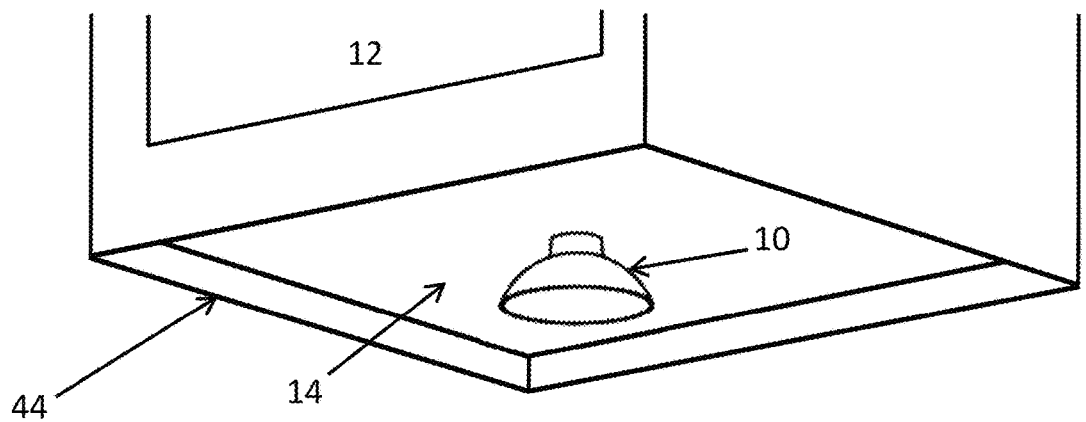
FIGS. 13A, 13B and 13C show an appliance design having the suction cup assembly inserted into a base foot print of the appliance, such that the bottom edge of the appliance lies flush with the surface thereby hiding the secured suction cup assembly.
Figure 13B:
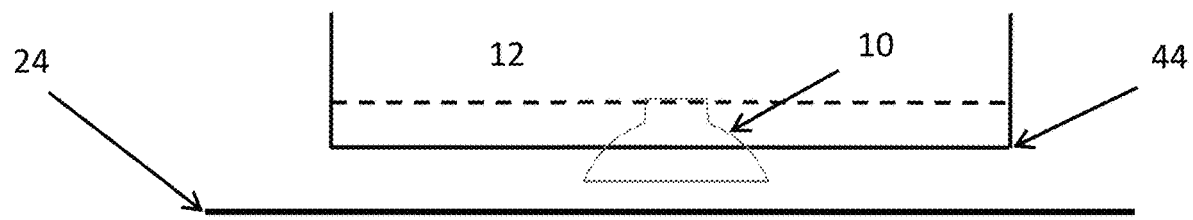
Figure 13C:
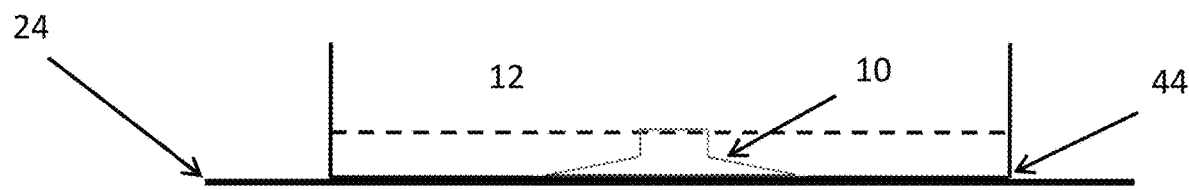

As shown in FIGS. 13A, 13B and 13C, the base or bottom wall 14 of the appliance 12 can be designed such that the electronic suction cup assemblies 10 securing the appliance 12 to the flat surface 24 are flush with the bottom edge 44 of the appliance 12, when the suction cup assemblies 10 are securing the appliance 12 to the flat surface. In such a design, the suction cup assemblies 10 would not be visible or accessible and essentially tamper resistant, so as to maintain security of the appliance 12 to the flat surface 24, until the suction cup assemblies 10 are remotely released by a secure electronic signal of the electronic circuit 32 that simultaneously activates each of the HGGCs 18 embedded in the center head 20 of each suction cup 16. As shown in FIG. 13C, the appliance 12 includes a rim 44, which engages the flat surface 24 and conceals the suction cup assembly 10 in the base of the appliance.

Figure 14A:
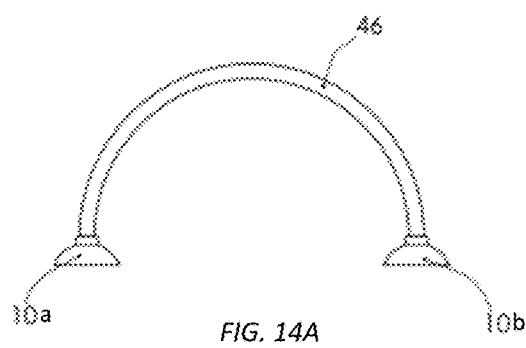
FIGS. 14A, 14B and 14C show a suction cup assembly of another embodiment of the present disclosure having two electronically-releasable suction cups permanently connected to a secured cable for use as a portable electronic security device.
Figure 14B:
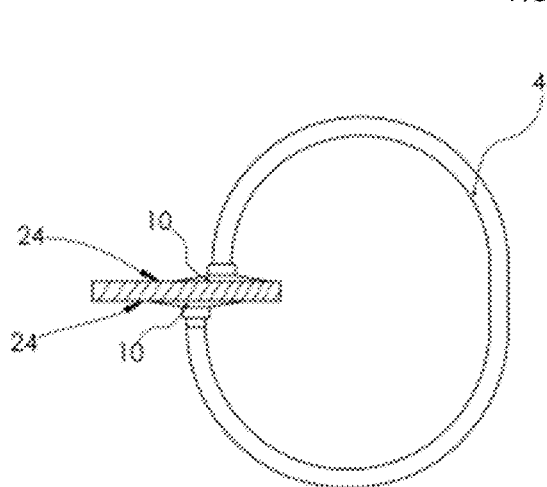
Figure 14C:
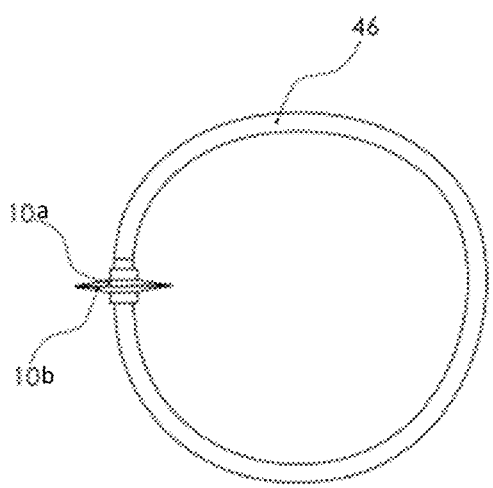

As shown in FIG. 14A, two electronic suction cup assemblies 10a and 10b can also be permanently fastened together with a cable, chain, or other secure connection 46 affixed to each of their top center heads 20a and 20b. This linkage of two suction cup assemblies 10a and 10b can be used to secure objects of value to larger or immovable objects, in a manner similar to the way a bicycle chain lock secures a bicycle to a bicycle rack or parking meter. As one example, the first suction cup assembly 10a can be secured to the surface of a large or immovable object such as a desk surface 14, while the second suction cup 10b is attached to a valuable object, such as a laptop or cell phone, tethering the object to the surface. In another example shown in FIG. 14B, a suction cup assembly 10a is affixed to the top surface 14 of a large or immovable object such as a table. Then, suction cup assembly 10b and the secure cable 46 are passed through a feature of a valuable object, such as the handle of a briefcase or purse. Finally, suction cup assembly 10b is affixed to the bottom surface 14 of that same table. As an option in this same example, the suction cup assembly 10b is passed through the handle of the briefcase or purse, then around the leg of a table, and finally attached to the face of suction cup assembly 10a, forming a secure loop that attaches both objects together.

Figure 15A:
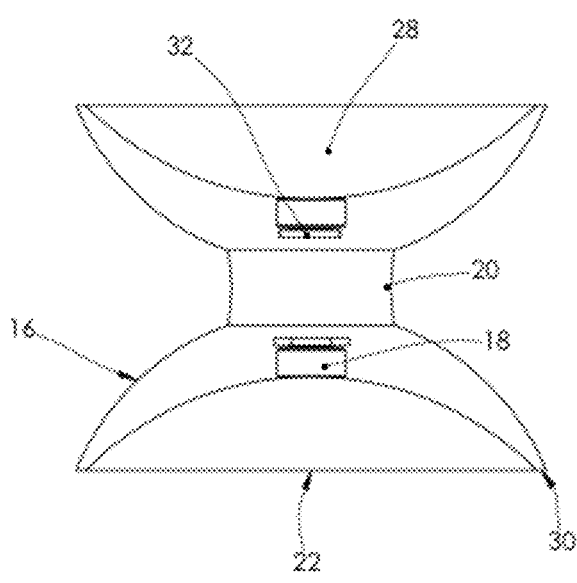
FIGS. 15A and 15B show a suction cup assembly of another embodiment of the present disclosure having two electronically-releasable suction cups, which are permanently connected by their respective center heads, allowing two objects to be secured to one another.
Figure 15B:
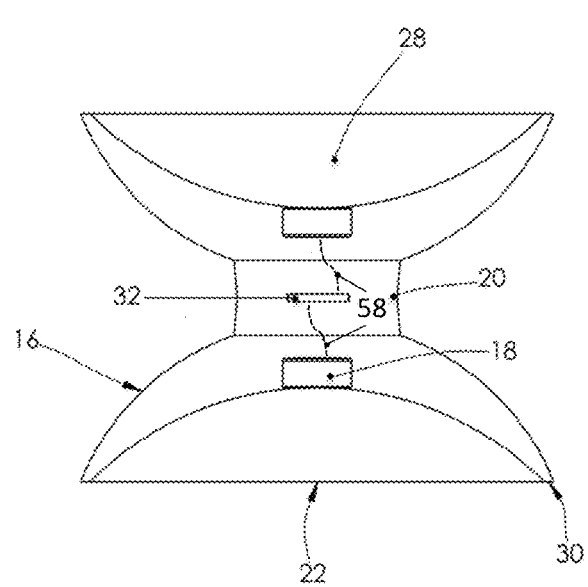

In another application shown in FIGS. 15A and 15B, a suction cup assembly can be comprised of two suction cups 16 that are oriented 180 degrees from one another and permanently affixed to one another at their respective center heads 20. This double suction cup assembly can be configured such that each suction cup 16 has its own gas generating cell 18 and electronic circuit 32, as shown in FIG. 15A. In another embodiment, the double suction cup assembly can be configured such that the suction cups 16 each have their own gas generating cells 18, while sharing a common electronic circuit 32 and an operable electronic coupling 58, as shown in FIG. 15B. In yet another embodiment (not illustrated), both suction cups 16 in the double suction cup assembly share a single gas generating cell 18 and electronic circuit 32, with a common channel allowing the gas generated at the output 26 of the gas generating cell, to be in fluid communication with the vacuum cavities 28 of both suction cups 16. In general, one can envision many possible configurations comprising one or more operational elements of suction cup assembly 10.

In yet another application, the suction cup 16 in suction cup assembly 10 can be inverted so as to form a convex shape through the application of an external force. In this convex position, the inverted suction cup functionally acts as a non-skid foot or pad on the bottom of an appliance 12. Upon activation, the inverted suction cup reverts to the shape of a suction cup 10 that can then secure an appliance 12 to a flat surface 24. In one embodiment, the concave suction cup 16 and convex suction cup (foot or pad mode) of the suction cup assembly 10 are activated by a mechanical mechanism or lever. In another embodiment, an authorized user can electronically "lock down" an appliance 12 by transforming the suction cup assembly 10 from inverted suction cup to suction cup 16 by electronically activating a mechanical lever. This electronic activation can be triggered locally when the authorized user is in the local proximity of the appliance 12, for example, by pressing a button that activates the mechanical lever. The electronic activation can also be triggered wirelessly via a remote control 42 that has been properly authorized or paired to the suction cup assembly 10.

In another embodiment, the electronic suction cup assembly 10 includes both a gas generating cell 18 and a micro-vacuum pump, both of which are electronically in communication with the electronic circuit 32. In one mode of operation, the micro-vacuum pump is activated by electronic circuit 32 and then pulls fluid from the vacuum cavity 28 of the suction cup assembly 10, securing suction cup 16 to a flat surface 24 with a vacuum. In a second mode of operation, the gas generating cell 18 is activated by the electronic circuit 32, releasing fluid into the vacuum cavity 28 of the suction cup 16 to alleviate the vacuum.

A method of securing objects or appliances can be applied to any object. The electronic suction cup can be designed into a base of a laptop or cell phone case, allowing a user to easily secure the device to a surface. A releasing mechanism can be integrated into other security mechanisms of the object, such as finger print authorization. When a security mechanism of a phone is activated by its owner, the suction cup assemblies would automatically release, allowing the owner to pick up his or her object. In other words, the switch 36 in the HGGC circuit 32, which is used to activate an ejection of hydrogen, can be a mechanical switch or an electronic switch, controlled manually, electronically or by any software application in any type of computer, app, or network system.

Although embodiments of the present disclosure illustrate a portable safe as an exemplary appliance 12, the suction cup assemblies 10 described herein can be applied to other appliances as well. For example, appliances can include: portable electronic devices, such as laptops, mobile phones, and pad devices; electronic devices, such as computers, appliances, and audio/video equipment; tools and tool boxes; toys and video games; artwork and collectibles; containers such as boxes, brief cases, purses, suitcases, and jewelry boxes; security bags made, for example, out of Kevlar or other robust materials; musical instruments; sports equipment; medical equipment; drug access and control; industrial equipment and material; commercial appliances and equipment; consumer appliances; any object of actual or perceived value; any container intended to hold one or more objects of actual or perceived value.

Thus, it should be observed that a portable and secure appliance, e.g., a portable safe, utilizing the electronically-releasable suction cup assembly and a secure electronic release mechanism, as well as the integration of the electronically-releasable suction cup assembly in portable electronic devices or their cases is shown and described herein. In essence, the electronically-releasable suction cup assembly can replace the "rubber feet" on the bottoms of many appliances and computers. In addition, a method related to a process of securing and releasing objects using the electronically-releasable suction cup assembly is further provided. For example, a hotel operator could use the electronically-releasable suction cup assembly to secure items which are commonly stolen, such as various appliances.

Embodiments of the present disclosure include a suction cup assembly that is attached to a portable safe that can be used by students in dormitories and the like that use a suction cup attachment with and without a gas generating cell. For example, a user can open the portable safe using a phone app operatively coupled to a locking mechanism. Then, once the door is open, the user can mechanically release the suction cup(s) from inside the safe, by for example, pulling a pin or actuating a valve that lets air into the vacuum chamber. Thus, access can be electronically secured through the phone, and once access is accomplished, the release of the suction cup assembly is generally physical or mechanical.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. An electronically-releasable suction cup assembly to releasably secure an object to a surface, the suction cup assembly comprising:
a suction cup secured to the object, the suction cup having a cavity and being configured to be releasably secured to the surface, the suction cup including a center head that is secured to the object and a base that defines the cavity, the center head having an opening in fluid communication with the cavity, the base being configured to be releasably secured to the surface by forming a vacuum with the surface; and
a button-sized gas generating cell coupled to the suction cup, the gas generating cell including at least one ejection port configured to selectively eject fluid into the cavity of the suction cup to release the suction cup from the surface, the gas generating cell being positioned within the opening and contained entirely within the suction cup.

2. The suction cup assembly of claim 1, wherein the base of the suction cup is fabricated from elastic, flexible material, and includes a flat or curved surface.

3. The suction cup assembly of claim 1, wherein the gas generating cell is connected to an electronic circuit to control the ejection of fluid from at least one ejection port of the gas generating cell.

4. The suction cup assembly of claim 3, wherein the electronic circuit includes a resistor and a switch, the switch being configured to take the resistor in and out of contact with positive and negative ends of the gas generating cell.

5. The suction cup assembly of claim 4, wherein the gas generating cell is inserted into the opening of the center head of the suction cup to enable electrical contact on both sides of the gas generating cell to the resistor placed in parallel to the gas generating cell.

6. The suction cup assembly of claim 4, wherein the resistor is configured with a resistance value to cause the gas generating cell to eject sufficient hydrogen from the at least one ejection port to alleviate or otherwise relieve a vacuum in the cavity of the suction cup to release the base of the suction cup from the surface.

7. The suction cup assembly of claim 4, wherein the switch controls when the circuit is closed and the gas generating cell is on to eject fluid from the at least one ejection port.

8. A method of releasably securing an object to a surface, the method comprising:
securing a suction cup of an electronically-releasable suction cup assembly to the object, the suction cup having a cavity and being configured to be releasably secured to the surface, the suction cup including a center head that is secured to the object and a base that defines the cavity, the center head having an opening in fluid communication with the cavity, the base being configured to be releasably secured to the surface by forming a vacuum with the surface; and selectively ejecting gas from a button-sized gas generating cell coupled to the suction cup, the gas generating cell including at least one ejection port configured to selectively eject fluid into the cavity of the suction cup to release the suction cup from the surface, the gas generating cell being positioned within the opening and contained entirely within the suction cup.

9. The method of claim 8, wherein the base of the suction cup is fabricated from elastic, flexible material, and includes a flat or curved surface.

10. The method of claim 8, further comprising connecting the gas generating cell to an electronic circuit to control the ejection of fluid from the at least one ejection port.

11. The method of claim 10, wherein the electronic circuit includes a resistor and a switch, the switch being configured to take the resistor in and out of contact with positive and negative ends of the gas generating cell.

12. The method of claim 11, wherein the gas generating cell is inserted into the opening of the center head of the suction cup to enable electrical contact on both sides of the gas generating cell to the resistor placed in parallel to the gas generating cell.

13. The method of claim 11, wherein the resistor is configured with a resistance value to cause the gas generating cell to eject sufficient hydrogen from the at least one ejection port to alleviate or otherwise relieve a vacuum in the cavity of the suction cup to release the base of the suction cup from the surface.

14. The method of claim 11, wherein the switch controls when the circuit is closed and the gas generating cell is on to eject fluid from the at least one ejection port.

* * * * *